United States Patent
Bastani et al.

(10) Patent No.: US 9,223,536 B1
(45) Date of Patent: Dec. 29, 2015

(54) METHOD, APPARATUS AND SYSTEM TO DETERMINE DISPLAY MISALIGNMENT

(71) Applicant: Google Inc., Mountain View, CA (US)

(72) Inventors: Behnam Bastani, San Jose, CA (US); Peyman Milanfar, Menlo Park, CA (US); Mary Lou Jepsen, Sausalito, CA (US)

(73) Assignee: Google Inc., Mountain View, CA (US)

( * ) Notice: Subject to any disclaimer, the term of this patent is extended or adjusted under 35 U.S.C. 154(b) by 63 days.

(21) Appl. No.: 14/095,838

(22) Filed: Dec. 3, 2013

(51) Int. Cl.
*G09G 5/10* (2006.01)
*G06F 3/14* (2006.01)

(52) U.S. Cl.
CPC .................................. *G06F 3/1423* (2013.01)

(58) Field of Classification Search
CPC ... G06F 3/1423; G06F 1/1616; G06F 3/1431; G06F 1/1647; G06F 1/1641; G06F 3/1454; G06F 1/1626
See application file for complete search history.

(56) References Cited

U.S. PATENT DOCUMENTS

| | | | |
|---|---|---|---|
| 6,611,241 B1 * | 8/2003 | Firester et al. | 345/1.3 |
| 7,019,713 B2 | 3/2006 | Hereld et al. | |
| 7,097,311 B2 | 8/2006 | Jaynes et al. | |
| 7,145,611 B2 | 12/2006 | Dubin et al. | |
| 7,339,625 B2 | 3/2008 | Matthys et al. | |
| 7,495,638 B2 | 2/2009 | Lamvik et al. | |
| 7,744,289 B2 | 6/2010 | Hu | |
| 7,854,518 B2 | 12/2010 | Culbertson et al. | |
| 7,956,842 B2 | 6/2011 | Ting | |
| 8,310,525 B2 | 11/2012 | Tan | |
| 8,406,562 B2 | 3/2013 | Bassi et al. | |
| 8,567,953 B2 | 10/2013 | O'Dor et al. | |
| 2002/0080302 A1 * | 6/2002 | Dubin et al. | 349/73 |
| 2003/0117545 A1 | 6/2003 | Coker et al. | |
| 2006/0012733 A1 | 1/2006 | Jin et al. | |
| 2010/0118050 A1 * | 5/2010 | Clodfelter et al. | 345/621 |
| 2010/0177261 A1 | 7/2010 | Jin et al. | |
| 2012/0300044 A1 | 11/2012 | Thomas et al. | |
| 2013/0093646 A1 | 4/2013 | Curtis et al. | |

* cited by examiner

*Primary Examiner* — Olga Merkoulova
(74) *Attorney, Agent, or Firm* — Blakely Sokoloff Taylor & Zafman LLP (57) ABSTRACT

Techniques and mechanisms for determining misalignment of one or more tileable display panels. In an embodiment, a plurality of images are processed to create a super-resolution image of the one or more tileable display panels. The super-resolution image may be processed to recognize one or more features indicating misalignment in a reference image displayed by the one or more tileable display panels. In another embodiment, the one or more features are evaluated based on fiducial data to generate a signal indicating an adjustment to be made to a first tileable display panel.

20 Claims, 8 Drawing Sheets

METHOD, APPARATUS AND SYSTEM TO DETERMINE DISPLAY MISALIGNMENT

BACKGROUND

1. Technical Field

This disclosure relates generally to displays, and in particular but not exclusively, relates to tiling displays.

2. Background Art

Large wall displays can be prohibitively expensive as the cost to manufacture display panels rises exponentially with display area. This rise in cost results from the increased complexity of large monolithic displays, the decrease in yields associated with large displays (a greater number of components must be defect free for large displays), and increased shipping, delivery, and setup costs. Tiling smaller display panels to form larger multi-panel displays can help reduce many of the costs associated with large monolithic displays.

While conventional multi-panel displays can reduce costs, visually they tend to have a major drawback. For example, a conventional display panel includes a bezel around its periphery. A bezel is a mechanical structure that houses a pixel region in which the display's pixels are disposed. In recent years, manufactures have reduced the thickness of bezels considerably to less than 2 mm. However, even these thin bezel trims are still very noticeable to the naked eye, distract the viewer, and otherwise detract from the overall visual experience.

Various approaches for obtaining seamless displays are being developed, including display lensing, blended projection, stackable display cubes, and LED tiles, However, as successive generations of display technologies continue to improve the quality of image display at the edge-to-edge interfaces of display devices, there is an increasing need for accuracy in the alignment between assembled display devices. Furthermore, continuing improvements in the size and resolution of display devices are resulting in an increasing need for accuracy in the alignment between components of an individual display device. For at least these reasons, there is expected to be an increasing need to provide efficient solutions for providing and/or maintaining alignment of multi-panel display assemblies.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Embodiments discussed herein variously provide for the determining of misalignment for one or more display panels. At some point in time during or after the mounting of an assembly of such display panels, two adjoining displays typically have some misalignment, however slight. For example, misalignment as small as approximately one-quarter (¼) of a pixel size between adjoining displays may cause visible image artifacts such as color banding, jagged lines, etc. Alternatively or in addition, process variation in the fabrication and/or assembly of display components may result in misalignment between adjoining sub-images displayed by a single display panel.

Certain embodiments include performing super-resolution calculations to create a super-resolution image based on a plurality of comparatively low-resolution images of only one single display panel or an assembly of display panels. The super-resolution image may be subsequently evaluated—e.g. based on fiducial information describing a reference image displayed by the assembly during a capturing of the plurality of images. As a result of such evaluation, misalignment information may be provided to quantify a misalignment within a single display panel and/or between different display panels, which in turn may be adjusted to improve display alignment.

Certain embodiments are discussed herein in the context of misalignment of an assembly of tileable display panels which each include mechanisms to project magnified sub-images on respective screen layer structures. However, certain embodiments are not limited in this regard, and such discussion may be extended to additionally or alternatively apply to misalignment for any of a variety of other types of one or more display panels.

Figure 1:
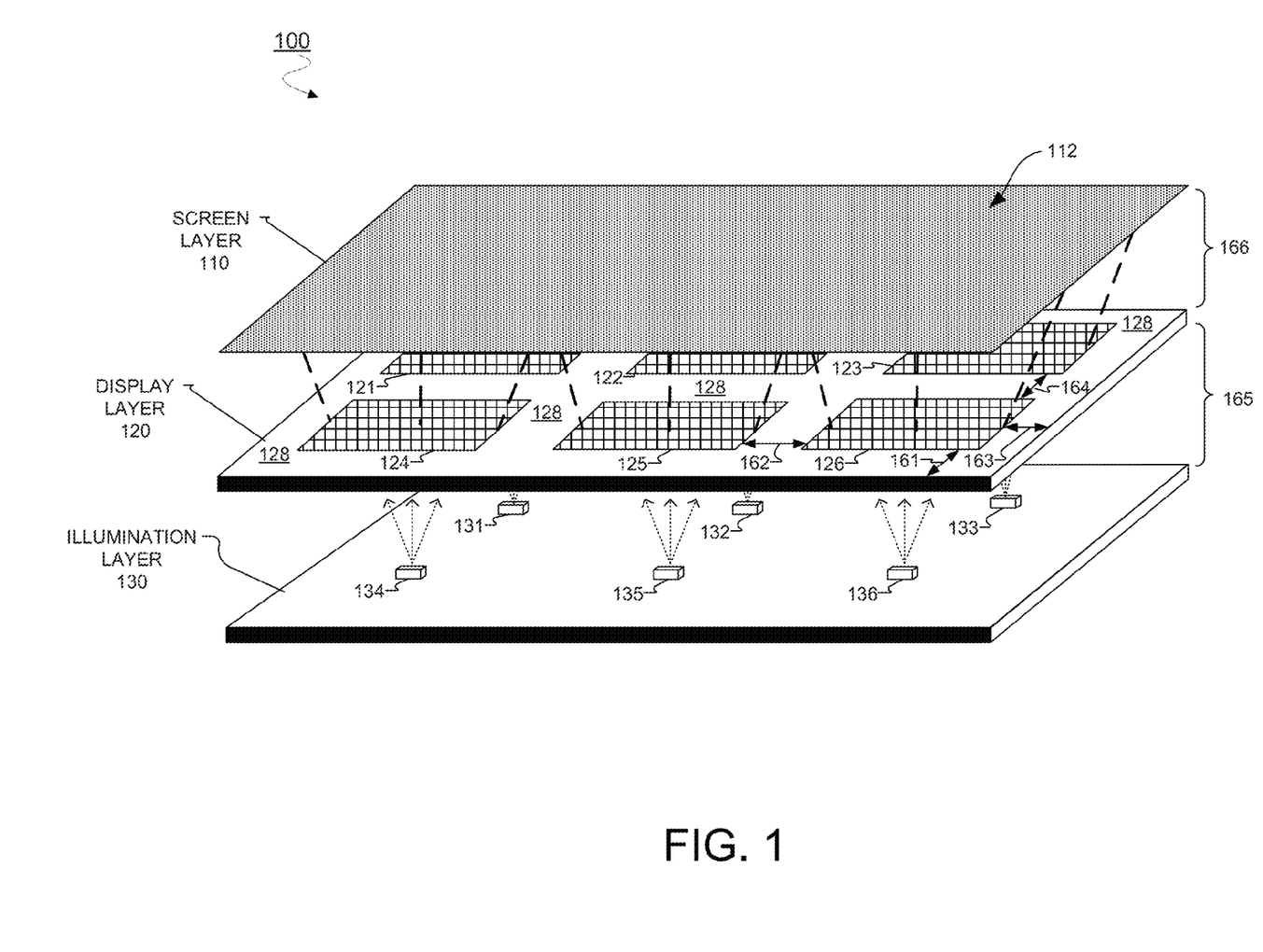
FIG. 1 is an illustration of a tileable display panel according to an embodiment.

FIG. 1 is an illustration of a tileable display panel according to an embodiment. In this embodiment, tileable display panel 100 includes display layer 120 disposed between screen layer 110 and illumination layer 130, which includes light sources 131, 132, 133, 134, 135, and 136 configured in a two-dimensional (2D) array. FIG. 1 shows that each light source in illumination layer 130 illuminates a corresponding array of transmissive pixels (referred to herein as a "pixelet" and described further below) to project a plurality of image sub-portions onto the backside of screen layer 110 so that the screen layer displays a unified image.

In one embodiment, each of light sources 131-136 of illumination layer 130 is a laser. In one embodiment, each light source is a light-emitting-diode ("LED") that emits light from a relatively small emission aperture. For example, LEDs with an emission aperture of 150-300 microns may be used. The LED may emit display light (e.g., white display light, blue display light, or any laser light). Each of light sources 131-136 is configured to emit its display light at a limited angular spread so the display light is directed toward a specific pixelet in display layer 120 (described further below). In one embodiment, additional optics are disposed over the light source in the array of light sources to define the limited angular spread of the display light emitted from the light sources. The additional optics may also increase brightness uniformity of the display light propagating toward the pixelets.

Display layer 120 is illustrated to include pixelets 121, 122, 123, 124, 125, and 126 configured as a matrix (i.e., a 2D array). The pixelets may be liquid-crystal-displays ("LCDs")—e.g., color LCDs or monochromatic LCDs.

Where the pixelets are LCDs, a micro-lens in the pixel may not be needed. In one embodiment, each pixelet measures 20×20 mm.

Pixelets 121-126 are shown to be configured in a 2×3 matrix in this embodiment. The pitch between each pixelet in the matrix may be the same. In other words, the distance between a center of one pixelet and the center of its adjacent pixelets may be the same distance. In the illustrated embodiment, each light source in illumination layer 130 has a one-to-one correspondence with a pixelet. For example, light source 131 corresponds to pixelet 121, light source 132 corresponds to pixelet 122, light source 133 corresponds to pixelet 123, and so on. Also in the illustrated embodiment, each light source is centered under its respective corresponding pixelet. Other embodiments may have a different light source-to-pixelet correspondence, or different light source positioning.

Display layer 120 also includes spacing regions 128 surrounding pixelets 121-126. Pixelet 126 is illustrated to be adjacent to pixelet 123 and 125. Pixelet 126 is spaced by dimension 162 from pixelet 125 and spaced by dimension 164 from pixelet 123. Dimensions 162 and 164 may be considered "internal spacing" and may comprise the same distance in some embodiments. Pixelet 126 is also spaced by dimensions 161 and 163 from edges of display layer 120. Dimensions 161 and 163 may be considered "external spacing" and are the same distance, in some embodiments. In one embodiment, dimensions 161 and 163 are half of the distance as dimensions 162 and 164. In one example, dimensions 161 and 163 are both 2 mm and dimensions 162 and 164 are both 4 mm.

Spacing region 128 contains a backplane region that may include pixel logic for driving the pixels in the pixelets. The architecture of tileable display panel 100 may increase space for additional circuitry in the backplane region. In one embodiment, the backplane region is used for memory-in-pixel logic. This memory may be used to allow each pixel to be refreshed individually instead of refreshing each pixel in a row at every refresh interval (e.g. 60 frames per second). In one embodiment, the backplane region is used for additional image processing.

While tileable display panel 100 may be used in high-resolution large format displays, the additional image processing capacity may also be useful for image signal processing, for example dividing an image into image sub-portions that are displayed by the pixelets. In another embodiment, the backplane region is used to embed image sensors. In one embodiment, the backplane region includes infrared image sensors for sensing three-dimensional 3D scene data in the display apparatus' environment.

In operation, display light from a light source (e.g. light source 131) propagates toward its corresponding pixelet (e.g. pixelet 121). Each pixelet drives their pixels to display an image sub-portion (i.e., a portion of a unified image to be displayed by tileable display panel 100) on the pixelet so the display light that propagates through the pixelet includes the image sub-portion displayed by the pixelet. Since the light source generates the display light from a small aperture and the display light has an angular spread, the image sub-portion in the display light gets larger as it gets further away from the pixelet. Therefore, when the display light (including the image sub-portion) encounters screen layer 110, a magnified version of the image sub-portion is projected onto a backside of screen layer 110.

Screen layer 110 is offset from pixelets 121-126 by distance 166 to allow the image sub-portions to become larger as the display light propagates further from the pixelet that drove the image sub-portion. Therefore, distance 166 may be a fixed distance selected to configure the size of the magnification of the image sub-portions. In one embodiment, fixed distance 166 is 2 mm. In one embodiment, each image sub-portion generated by pixelets 121-126 is magnified by 1.5×.

The backside of screen layer 110 is opposite viewing side 112. Screen layer 110 may be made of a diffusion screen that presents the unified image on viewing side 112 of screen layer 110 by scattering the display light (that includes the image sub-portions) from each of the pixelets 121-126. Screen layer 110 may be similar to those used in rear-projection systems. Screen layer 110 may have local dimming capabilities independent of light sources 131-136.

Figure 2:
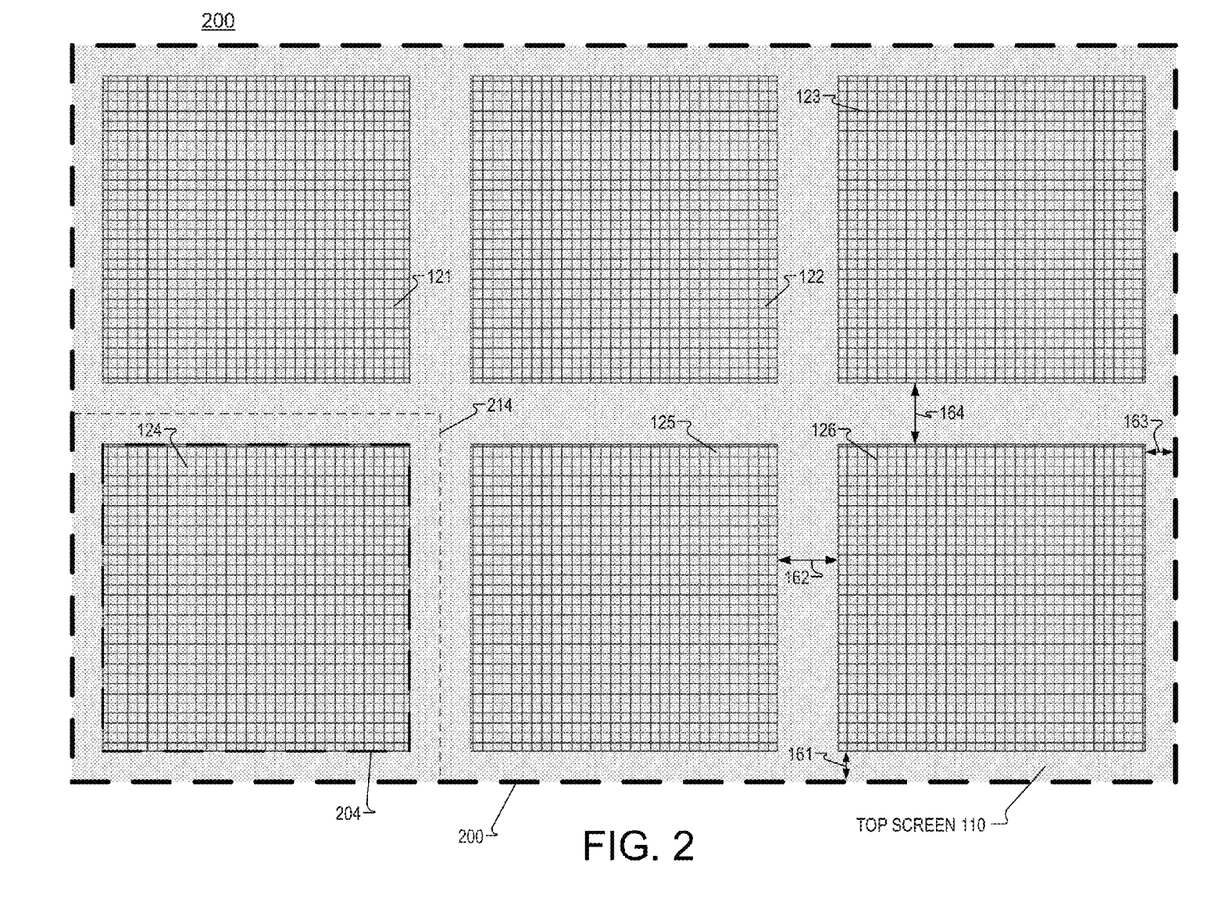
FIG. 2 is a transparent illustration of a tileable display panel according to an embodiment.

FIG. 2 is a transparent illustration of a tileable display panel according to an embodiment. FIG. 2 illustrates tileable display panel 100 looking through screen layer 110 to display layer 120. FIG. 2 shows how tileable display panel 100 can generate a unified image 200 using the magnified image sub-portions (e.g. image sub-portion 214) generated by light sources 131-136 and their corresponding pixelets 121-126. In this illustration, pixelet 124 generates image sub-portion 204 that is projected (using the display light from light source 134) on screen layer 110 as magnified image sub-portion 214. Although not illustrated, each of pixelets 121, 122, 123, 125, and 126 can also project a magnified image sub-portion onto screen layer 110 that is the same size as magnified image sub-portion 214. Those five magnified image sub-portions combined with magnified image sub-portion 214 combine to form unified image 200. In some embodiments, the geometric alignment of the magnified image sub-portions may leave virtually no gap (if any) such that unified image 200 is perceived as seamless by a viewer.

In FIG. 2, the magnified image sub-portions are illustrated to be roughly the same size and are similarly square-shaped. In other embodiments, said magnified image sub-portions may comprise any shape, any size, and in any combination. To generate same sized magnified image sub-portions, display layer 120 and pixelets 121-126 may be offset from light sources 131-136 by fixed dimension 165 (as shown in FIG. 1). In one embodiment, dimension 165 is 8 mm.

The device architecture of tileable display panel 100 may further allow for controlling the brightness of light sources 131-136—e.g. based on the image/video content of the corresponding image sub-portions. Each pair of pixelets 121-126 and light sources 131-136 are independent of each other, and in some embodiments, light from one pair of pixelet and light source (e.g., pixelet 125 and light source 125) does not leak into any of its neighboring pairs (e.g., pixelet and light source pairs 124/134, 126/136 and 122/132). Dynamically varying the brightness level of light sources 131-136 based on the image/video content of the corresponding image sub-portions allows for improved contrast in unified image 200 and a reduced power consumption for tileable display panel 100. Furthermore, embodiments may increase the available bit depth for pixel data, resulting in smoother gradients and improved image quality.

Figure 3:
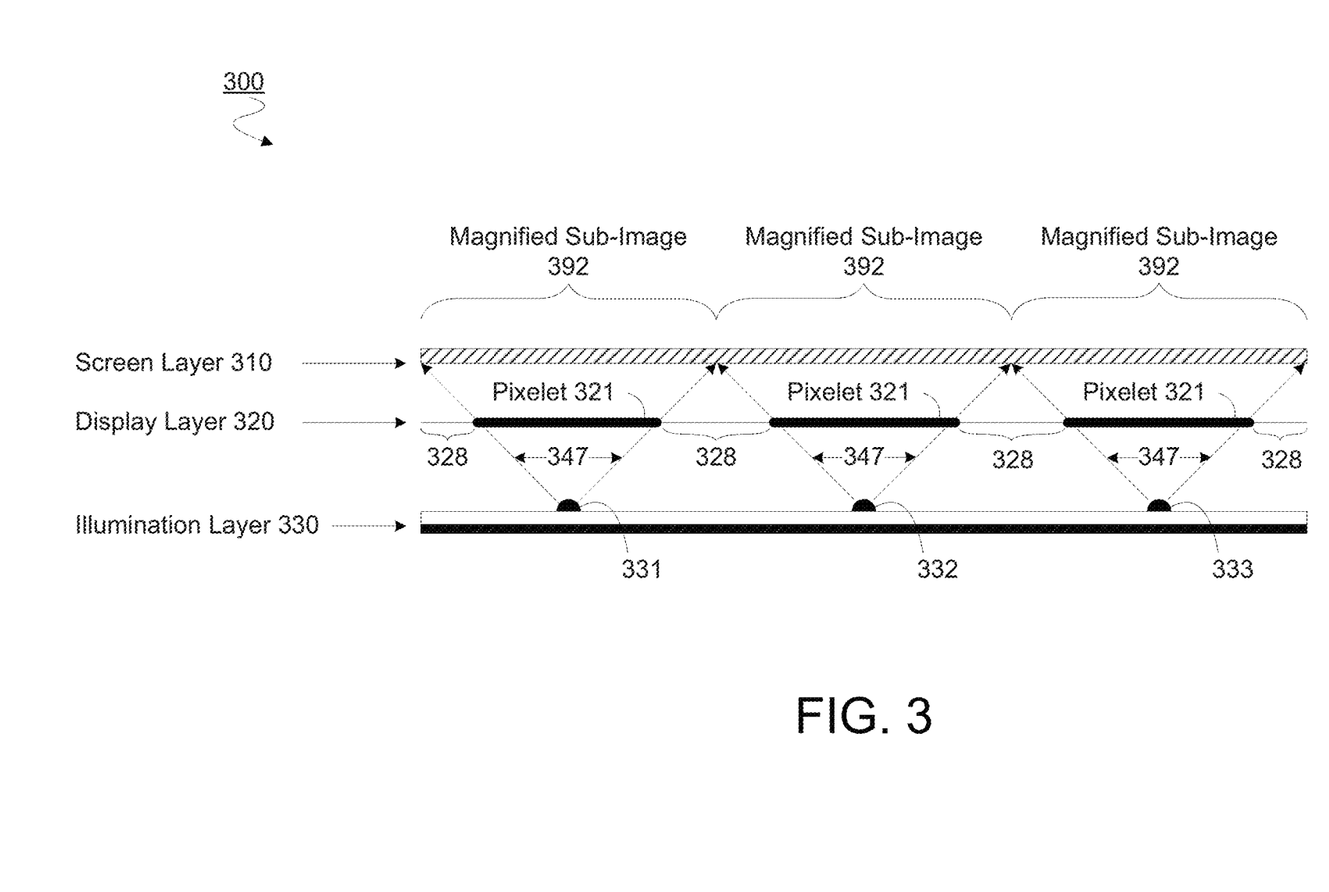
FIG. 3 is an illustration of a tileable display panel according to an embodiment.

FIG. 3 is an illustration of components of a tileable display panel for displaying image sub-portion data according to an embodiment. In this embodiment, a portions of the components of tileable display panel 300 are illustrated from a cross-sectional view as including an illumination layer 330 comprising light sources 331-333 to emit display light at a limited angular spread so the display light is directed toward pixelets 321 of a display layer 320—e.g. according to techniques described herein. When display light (including a corresponding image sub-portion) encounters screen layer 310, a magnified version of the image sub-portion is projected onto a backside of the screen layer so that it is viewable to the user, shown as magnified sub-images 392 from FIG. 3.

Each light source 331-336 is configured to emit a divergent projection beam 347 having a limited angular spread that is directed toward a specific corresponding one of multiple pixelets 321 in display layer 320, as illustrated in FIG. 3. In an embodiment, a distance between two of the pixelets 122 which are closest to one another is greater than a distance between adjacent pixels in either one of those two pixelets. For example, a distance between adjacent pixelets may be in a range of 7-20 times the size of a single pixel and/or in a range of 40-100 times the distance between pixels of a single pixelet.

In one embodiment, divergent projection beam 347 may be substantially shaped as a cone (circular aperture) or an inverted pyramid (rectangle/square aperture). Additional optics may be disposed over each light source in the array of light sources to define the limited angular spread (e.g. 20-70 degrees) and/or cross-sectional shape of divergent projection beam 347 emitted from the light sources. The additional optics (including refractive and/or diffractive optics) may also increase brightness uniformity of the display light so that the intensity of divergent projection beam 347 incident upon each pixel in a given pixelet is substantially similar.

In some embodiments (not illustrated in FIG. 3), divergent projection beams 347 from different light sources may overlap upon the spacing region 328 on the backside of display layer 320. In some embodiments, each pixelet is directly illuminated solely by one divergent projection beam from its corresponding light source, which may approximate a point source. In certain embodiments, a very small percentage of light from non-corresponding light sources may become indirectly incident upon a pixelet due to unabsorbed reflections of divergent projection beams 347 from non-corresponding light sources. Spacing regions 328 and illumination layer 330 may be coated with light absorption coatings (known in the art) to decrease reflections from non-corresponding light sources from eventually becoming incident upon a pixelet that does not correspond with the light source. The limited angular spread of the light sources may be designed to ensure that divergent projection beams 347 only directly illuminates the pixelet that corresponds to a particular light source. In contrast, conventional LCD technology utilizes light sources (e.g. LEDs or cold-cathode-fluorescents) with a generally Lambertian light distribution and diffusive filters in an attempt to generate uniform and diffuse light for backlighting the LCD panel. By implementing each light source (e.g., light sources 331-333) as a near point source, each pixel within a given pixelet exclusively projects onto a corresponding region on the backside of screen layer 310 on a one-to-one basis.

Figure 4:
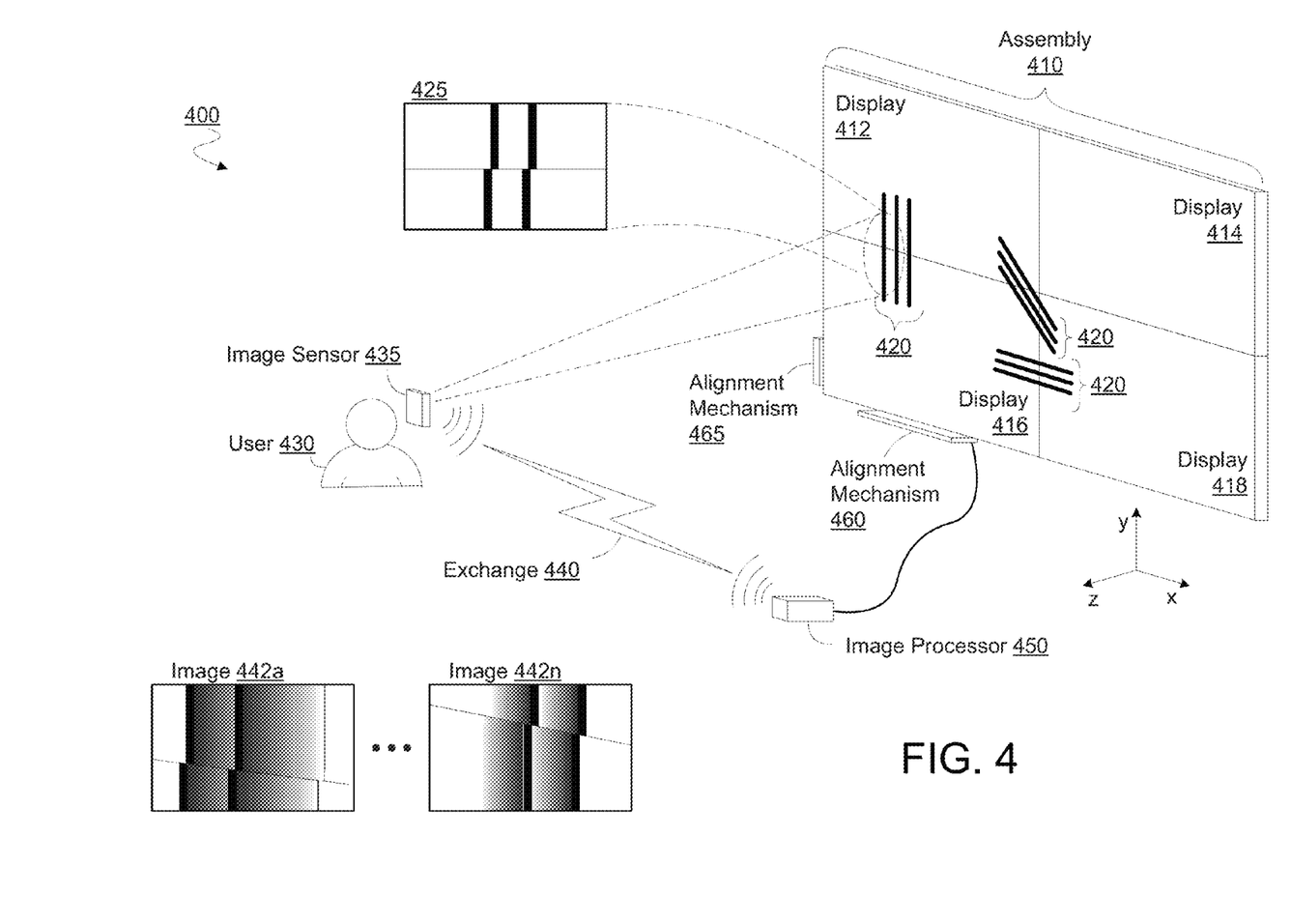
FIG. 4 is an illustration of a system according to an embodiment to detect misalignment for an assembly of tileable display panels.

FIG. 4 illustrates elements of a system 400 according to an embodiment for determining misalignment of a multi-panel display assembly. In an illustrative scenario according to one embodiment, system 400 operates to determine whether an adjustment is needed to improve an alignment of one or more displays in an assembly 410. Assembly 410 may comprise a plurality of tileable display panels—e.g. including panels which each include some or all of the features of display panel 100, display panel 300 or the like. However, certain embodiments are not limited to the particular type of display panels of assembly 410.

As shown in FIG. 4, assembly 410 may include a two-by-two array of displays 412, 414, 416, 418, various pairs of which have respective edges adjoining one another along an x-dimension or along a y-dimension. However, assembly 410 may include any of a variety of additional or alternative configurations of displays, according to different embodiments. Assembly 410 may be part of system 400, although certain embodiments are not limited in this regard. Certain features of various embodiments are discussed herein with respect to alignment of displays 412, 416 with one another along the x-dimension. However, such discussion may be extended to additionally or alternatively apply to alignment of any of various other pairs of displays.

Displays 412, 414, 416, 418 may be variously mounted into or on a wall, ceiling, floor or other fixed structure (not shown). For example, assembly 400 may include or couple to mounting hardware and/or structures or mechanisms for connection to such mounting hardware. One or more alignment mechanisms may be included in (or coupled to) such mounting hardware, structures or mechanisms—e.g. where such alignment mechanisms are configured to perform fine position adjustment of one or more display panels. By way of illustration and not limitation, assembly 410 may include, or couple to, one or both of an alignment mechanism 460 for adjustment of display 416 along the x-dimension, and an alignment mechanism 465 for adjustment of display 416 along the y-dimension. Alignment mechanisms 460, 465 may include, for example, any of a variety of servomotors, adjustment screws, controller logic and/or other hardware for adjusting the position of display 416. However, the particular mechanism(s) for adjusting the position of one or more displays of assembly 410 are not limiting on certain embodiments, and may be adapted from existing structures and/or techniques.

At some point in time—e.g. during installation of assembly 410 and/or thereafter—a position of at least one display of assembly 410 may need to be adjusted relative to a position of another display of assembly 410. To determine whether such adjusted is to be performed, certain embodiments evaluate (and in an embodiment, capture) a plurality of images which each include a respective representation of a portion of assembly 410. For example, system 400 may include or couple to an image sensor 435 which is to capture a plurality of images 442a, . . . , 442n—e.g. including frames of a video sequence and/or still digital pictures. Image sensor 435 may include, or be incorporated into, any of a variety of consumer electronic devices. For example, image sensor 435 may include (or be a component of) a handheld, wearable or otherwise portable device including, but not limited to, a digital camera, camcorder, cell phone, laptop, game system tracking device, wearable video recording device or the like. Alternatively, image sensor 435 may be part of a desktop computer, laptop computer, game console or other relatively fixed device.

Image sensor 435 may participate in an exchange 440 which provides images 442a, . . . , 442n to an image processor 450 of system 400. Image processor 450 may include any of a variety of combinations of hardware logic (e.g. including a processor and memory) and/or executing software logic to generate misalignment information based on super-resolution analysis of images such as images 442a, . . . , 442n. In an embodiment, image sensor 435 and image processor 450 may be components of the same device, or are otherwise incorporated into the same device. For example, image processor 450 may include an application or other software process which executes on a smart phone, tablet, gaming console, or other consumer electronics device which also includes image sensor 435. Such a software process may include, for example, a standalone application, any of various applets widgets or other processes which may execute in a host execution environment (e.g. as a mobile app), a software thread, method or the like.

Alternatively, image processor 450 may include a software process and/or dedicated circuit logic which operates on another device distinct from that including image sensor 435—e.g. where exchange 440 is conducted via any of a variety of wired and/or wireless communications including, but not limited to, WiFi communications, Bluetooth communications, LTE communications, cellular communications, Ethernet communications, or the like. For example, image processor 450 may be a remote resource which is accessed by other components of system 400 via a network (not shown). In an embodiment, image processor 450 is a network service which is provided by one or more remote servers via a local area network (LAN), wide area network (WAN), home network, Internet, cloud or other such network. In still another embodiment, image processor 450 is incorporated into assembly 410 and/or alignment hardware coupled to assembly 410. For example, image processor 450 may be incorporated into a display of assembly 410, into one of the alignment mechanisms 460, 465, or the like.

During a period of time when the images 442a, . . . , 442n are being captured, some or all displays of assembly 410 may display one or more reference images, as represented by the illustrative test pattern 420. Displays 412, 416 may each display a respective portion of test pattern 420 at their respective adjoining sides. In an embodiment, image processor 450 performs super-resolution processing of images 442a, . . . , 442n to create a super-resolution image 425 of a portion of the one or more reference images displayed as test pattern 420 by assembly 410.

For example, as compared to images captured by some existing high-quality hardware, one or more of images 442a, . . . , 442n may be of low resolution or otherwise of poor image quality—e.g. due to the quality of image sensor 435, movement of image sensor 435 by user 430 during an image capture, movement of image sensor 435 by user 430 between image captures and/or the like. As a result, some or all of images 442a, . . . , 442n may, for example, be inconsistent with one another in one or more respects. For example, some or all of a yaw angle, pitch angle, roll angle, x-dimension position, y-dimension position and/or z-dimension position of image sensor 435 may vary for different ones of images 442a, . . . , 442n. Alternatively or in addition, a zoom, focus and/or exposure setting of image sensor 435 may vary for different ones of images 442a, . . . , 442n. In some embodiments, images 442a, . . . , 442n may include various different jitter artifacts and/or blur artifacts.

As discussed herein, super-resolution processing of images 442a, . . . , 442n may be performed according to an embodiment to generate a super-resolution image 425 of the adjoining displays 412, 416. Super-resolution image 425 may include one or more artifacts which are indicative of misalignment—e.g. between displays 412, 416—where such one or more artifacts are more clearly detectable than they might be in any of the comparatively low resolution images 442a, . . . , 442n. The one or more reference images may provide a basis for fiducial information which image processor 450 (or alternatively, other logic of assembly 410) evaluates in conjunction with the super-resolution image 425 to quantify misalignment between displays of assembly 410.

For example, image processor 450 may receive, send or otherwise determine fiducial information which describes some or all features of the one or more reference images. Feature recognition logic of image processor 450 may be used to identify portions of super-resolution image 425 as corresponding to features of the one or more reference images. In embodiment, image processor 450 performs one or more calculations to compare regions of super-resolution image 425 to the one or more reference images. Based on such calculations, image processor 450 may determine a misalignment value which quantifies or otherwise identifies a misalignment artifact in super-resolution image 425.

Based on the determined misalignment value, image processor 450 may send—e.g. to assembly 410 and/or one of alignment mechanisms 460, 465—a signal indicating an adjustment to be made to one or more displays of assembly 410. For example, image processor 450 may signal a direction of adjustment and/or an amount of adjustment to reposition display 416 along the x-dimension. Such communications between image processor 450 and assembly 410 (or an alignment mechanism coupled thereto) may be via any of a variety of wired and/or wireless communications including, but not limited to, WiFi communications, Bluetooth communications, LTE communications, cellular communications, Ethernet communications, or the like. In one embodiment, a sequence such as that discussed herein (e.g. including image capture and communication, super-resolution calculation, misalignment evaluation and display adjustment) is repeated until alignment is detected—e.g. to at least below some maximum misalignment threshold.

Figure 5:
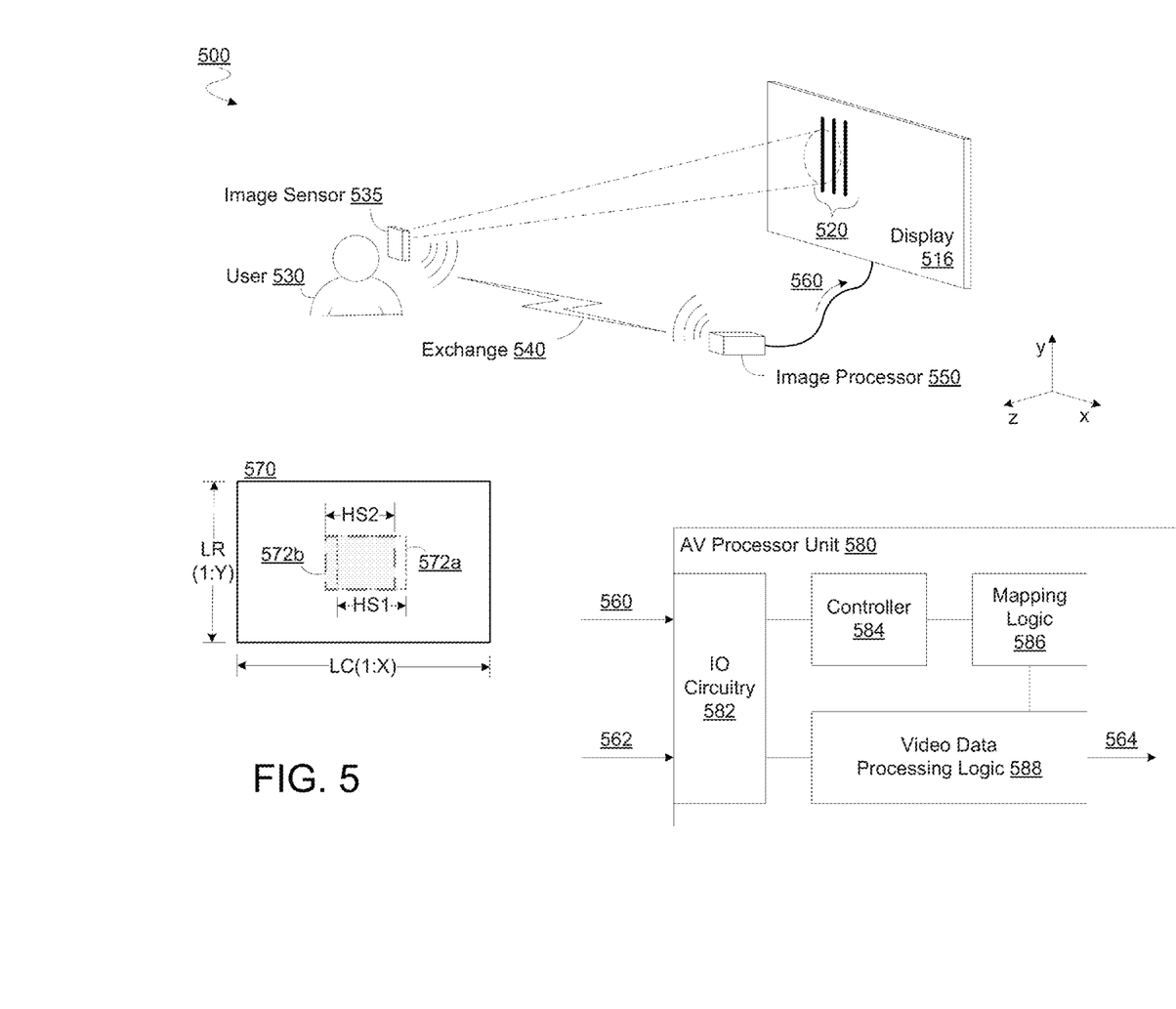
FIG. 5 is an illustration of a system according to an embodiment to detect misalignment for a single display panel.

FIG. 5 illustrates elements of a system 500 according to an embodiment for determining display misalignment for only a single display panel. In an illustrative scenario according to one embodiment, system 500 operates to determine whether an adjustment is needed to improve an alignment, with respect to one another, of different portions—e.g. including different pixelets or other pixel groups—of the same display 516. In one embodiment, display 516 includes some or all of the features of display panel 100, display panel 300 or the like.

To determine whether such adjusted is to be performed, certain embodiments evaluate (and in an embodiment, capture) a plurality of images which each include a respective representation of display 516. System 500 may include or couple to an image sensor 535 which is to capture a plurality of images (not shown)—e.g. in a manner similar to the capturing of images 442a, . . . , 442n by image sensor 535. Image sensor 535 may participate in an exchange 540 which provides such images to an image processor 550 of system 500—e.g. where image sensor 535 and image processor 550 include some or all of the respective features of image sensor 435 and image processor 450.

In an embodiment, image processor 550 performs super-resolution processing of images received via exchange 540 to create a super-resolution image of a portion of one or more reference images (such as the illustrative test patient 520) displayed by display 516. Such one or more reference images may provide a basis for fiducial information which image processor 550 (or alternatively, other logic of display 516) evaluates in conjunction with the super-resolution image to quantify misalignment between different portions of display 516. Based on the determined misalignment, image processor 550 may send—e.g. to display 516 and/or an alignment mechanism coupled thereto—a signal 560 indicating an adjustment to be made to display 516.

In one illustrative embodiment, display 516 includes an audio-video (AV) processor unit 580 including any of a variety of hardware logic and/or software logic to process an AV stream 562 to generate an output 564 for controlling other hardware (e.g. illumination layer hardware, display layer hardware and/or the like) of display 516. AV stream 562 may include video data which can be represented conceptually with a logical display region 570 comprising Y logical rows LR(1:Y) and X logical columns LC(1:X). For example, individual frames of AV stream 562 may each include video data variously specifying respective pixel values for locations within logical display region 570. In an embodiment, AV processor unit 580 may be variously configured to correspond a pixelet (or other component) of display 516 at different times with different portions of logical display region 570.

By way of illustration and not limitation, a first configuration of AV processor unit 580 may allocate or otherwise correspond to the pixelet those pixel values of AV stream 562 which are in a sub-region 572a of logical display region 570. Such correspondence may be specified or otherwise implemented with a mapping table, one or more timing settings and/or other configuration state of mapping logic 586. In such a configuration, video data processing logic 588 of AV processor unit 580 may receive AV stream 562—e.g. via IO circuitry 582—and perform video processing which, in part, allocates to the pixelet portions of output 564 which represent sub-image information for sub-region 572a.

Alternatively or in addition, AV processor unit 580 may receive signal 560 and, in response, implement a different configuration to mitigate a misalignment of the pixelet—e.g. relative to an adjoining pixelet of display 516. For example, a controller 584 of AV processor unit 580 may update configuration state of mapping logic 586 in response to signal 560. Such a change to mapping logic 586 may instead correspond the pixelet to a different sub-region 572b of logical display region 570. In an illustrative scenario according to one embodiment, a horizontal (x dimension) span HS1 of sub-region 572a is to the right of a horizontal span HS2 of sub-region 572b—e.g. where sub-region 572a spans rows [x1, x2] of LC(1:X) and sub-region 572b spans rows [(x1-1), (x2-1)] of LC(1:X). Accordingly, corresponding the pixelet to sub-region 572b may correct a misalignment of the pixelet to the left, relative to one or more other components of display 516. The modified configuration state of mapping logic 586 may change a timing or other operational characteristic of video codes 588 to instead allocate to the pixelet portions of output 564 which represent sub-image information for sub-region 572b.

Figure 6:
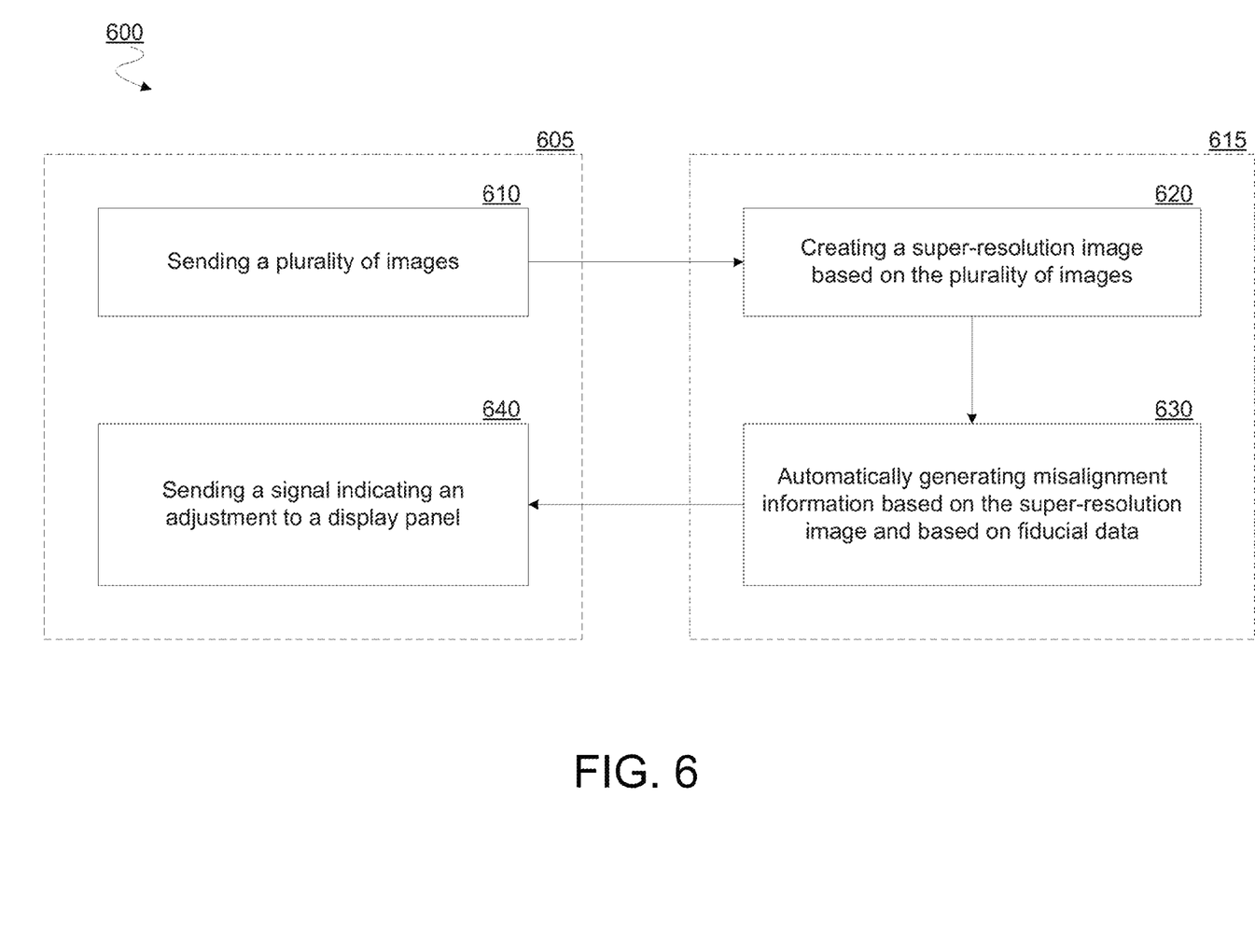
FIG. 6 is a flow diagram illustrating elements of a method according to an embodiment to detect misalignment for an assembly of tileable display panels.

FIG. 6 illustrates elements of a method 600 for determining misalignment of one or more display panels according to an embodiment. Method 600 may be performed, for example, to detect misalignment in a single display and/or in an assembly having some or all of the features of assembly 410, for example. In an embodiment, method 600 is performed by one or more components of system 400 or system 500—e.g. by one or more devices which include some or all of the features of one of image sensors 435, 535 and/or one of image processors 450, 550.

For example, method 600 may include operations 615 which are performed by hardware logic and/or executing software logic which provides the functionality of one of image processors 450, 550. Method 600 may further comprise other operations 605 which are performed by other hardware logic and/or executing software logic than that which performs operation 615. For example, operations 605 may be performed by hardware logic and/or software logic such as that of one of image sensors 435, 535, display 516 and/or of assembly 410.

Method 600 may include, at 610, sending a plurality of images each including a respective representation of one or more display panels. In an embodiment, the sending the plurality of images at 610 includes sending one or more of the plurality of images via a network such as an Internet, cloud network or the like. Alternatively, the plurality of images may be captured with image sensor hardware of a first device, wherein the sending the plurality of images at 610 includes sending the images to a software process which is executing on that same first device.

Method 600 may further comprise, at 620, creating a super-resolution image based on the exchanged plurality of images. The super-resolution image created at 620 may include some or all of the features of super-resolution image 425, for example. In an embodiment, method 600 further comprises, at 630, automatically generating misalignment information based on the super-resolution image and based on fiducial data describing a reference image. The automatic generating at 630 may include performing automatic feature recognition to identify portions of the super-resolution image as corresponding to features of the reference image. The automatic generating at 630 may further comprise performing one or more calculations to compare a region of the super-resolution image to a corresponding feature of the reference image. Such comparison may include calculating a misalignment value which quantifies or otherwise identifies a misalignment artifact in the super-resolution image.

Method 600 may further comprise, at 640, sending a signal based on the misalignment information, the signal indicating an adjustment to a first tileable display panel. In an embodiment, the signal sent at 640 is further generated based on data which describes one or more features describing the one or more display panels. Such data may identify a relative configuration of display panels with respect to one another in an assembly. Alternatively or in addition, such data may identify a correspondence of some or all such displays each with a respective portion of a reference image. For example, the data may identify a first portion of a reference image as being displayed by a first display, and a second portion of the same reference image (e.g. adjoining the first portion) as being displayed by a second display image. Alternatively or in addition, the data may identify one or more dimensions of a display, or otherwise indicate a scale of one or more features of the reference image as it is displayed by the one or more display panels. Based on such data and the misalignment information, a particular display (or displays) to be adjusted, where a direction and/or physical distance of such adjustment may be determined and communicated with the signal sent at 640.

Method 600 may include one or more additional operations (not shown) such as some or all of those discussed herein with respect to system 400. For example, method 600 may further include automatically adjusting a tileable display panel in response to the signal sent at 640. In another embodiment, method 600 may further comprise additional misalignment detection—e.g. including a subsequent sending of a second plurality of images each including a respective representation of the one or more display panels, wherein a second super-resolution image is created based on the sending of the second plurality of images, and wherein second misalignment information is automatically generated based on the second super-resolution image and based on the fiducial data.

Figure 7:
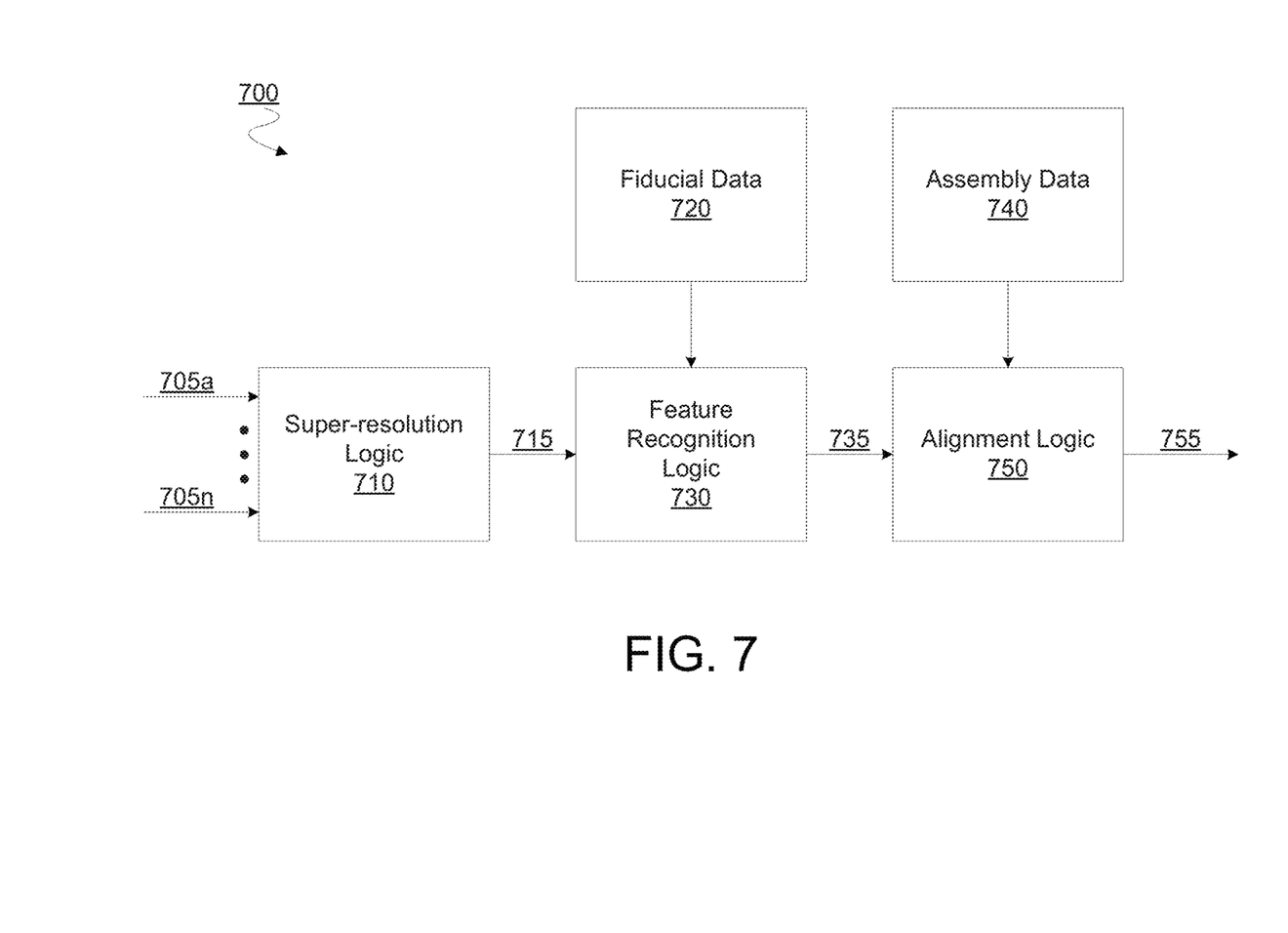
FIG. 7 is a block diagram illustrating elements of a device configured to signal an adjustment for an assembly of tileable display panels an according to an embodiment.
Figure 8:
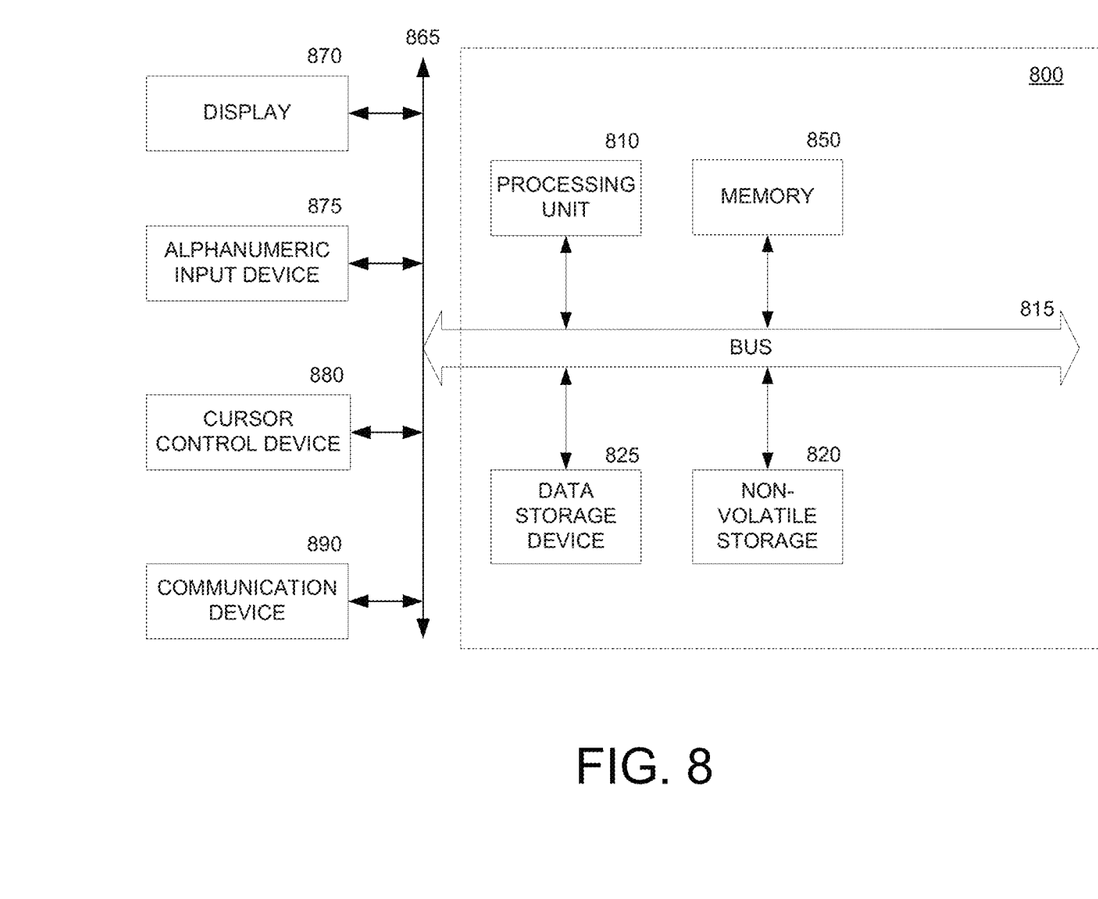
FIG. 8 is an illustration of components of a hardware platform according to an embodiment.

FIG. 7 illustrates elements of a device 700 for determining misalignment of one or more tileable displays according to an embodiment. Device 700 may include some or all of the features of image processor 450, for example. In an embodiment, device 700 includes any of a variety of combinations of hardware logic and/or executing circuit logic to perform some or all of the operations of method 500.

In an embodiment, device 700 includes super-resolution logic 710 to receive a plurality of images 705a, . . . , 705n which each include a respective representation of one or more tileable displays. For example, device 700 may receive the plurality of images 705a, . . . , 705n from another device—e.g.

via an Internet or other network. In an alternate embodiment, device 700 includes image sensor hardware (not shown) which generates the plurality of images 705a, . . . , 705n while the one or more panels are displaying one or more reference images and subsequently sends the plurality of images 705a, . . . , 705n to super-resolution logic 710.

Super-resolution logic 710 may perform processing of the plurality of images 705a, . . . , 705n to generate a super-resolution image 715 which represents a comparatively high-resolution version of information which is variously represented by some or all of the plurality of images 705a, . . . , 705n. Such processing by super-resolution logic 710 may include one or more operations adapted from known super-resolution techniques, the details of which are not discussed in detail herein.

Super-resolution image creation increases the resolvable detail of information which is variously represented in a plurality of images. Super-resolution techniques may generate a still image of a scene from a collection of similar lower-resolution images of the same scene. For example, several low-resolution still pictures (or alternatively, frames of video) may be averaged together or otherwise combined using super-resolution techniques to produce a single still image whose resolution is significantly higher than that of any single one of the original pictures (or video frames). Because each low-resolution frame is slightly different and contributes some unique information that is absent from the other frames, the reconstructed still image has more information, i.e., higher resolution, than that of any one of the originals alone.

In one illustrative embodiment, one of the low-resolution images 705a, . . . , 705n is selected as a reference image (or "primary" image), and the remaining low resolution images are non-reference images (or "secondary" images). Each secondary image is registered with respect to the primary image. This allows transforming the secondary images to motion compensated images. For each motion compensated secondary image, a mask value for each pixel of the secondary image is estimated based on a registration error of the secondary image with respect to the primary image. In one embodiment, the mask value for a pixel in the secondary image indicates a likelihood that the pixel will be included in the super-resolution image. A super-resolution image of the primary image is then generated by combining the mask values and the motion compensated secondary images. However, the particular type of super-resolution algorithm to be adapted for use in processing the plurality of images 705a, . . . , 705n may not be limiting on various embodiments.

The resulting super-resolution image 715 may be provided to feature identification logic 730 of device 700. In an embodiment, feature resolution logic 700 may perform processing—e.g. including one or more calculations adapted from known feature recognition techniques—to identify one or more portions of the super-resolution image 715 each as corresponding to a respective features of one or more reference images which are represented in the plurality of images 705a, . . . , 705n. For example, feature identification logic 730 may access fiducial data 720 which includes, or otherwise describes, features of a test pattern or other reference image which is displayed by one or more tileable display panels during the capturing of the plurality of images 705a, . . . , 705n Based on fiducial data 720, feature identification logic 730 may identify a first portion of super-resolved image 715 as corresponding to a first portion of a reference image feature, and identify a second, adjoining portion of super-resolved image 715 as corresponding to a second portion of that same reference image feature. In an embodiment, feature identification logic 730 may further detect for indicia of display misalignment in super-resolution image 715. For example, feature identification logic 730 may detect a misalignment of such first and second portions of super-resolution image 715—e.g. based on a comparison to a corresponding alignment of the corresponding first and second portions of the reference image. Detection of such misalignment may include determining whether an offset of the first and second portions of super-resolved image 715 relative to one another is greater than some maximum misalignment threshold value.

In an embodiment fiducial data 720 specifies or otherwise indicates respective dimensions (e.g. including width, length, etc.) of one or more features of a reference image, between such one or more features, or the like. Some or all such dimensions may be used as a reference by feature identification logic 730 for determining a direction and/or degree of misalignment—e.g. where feature identification logic 730 calculates a ratio based on a length of a misalignment indicium and a dimension of a feature of the reference image. Feature identification logic 730 may generate misalignment information 735 which describes the misalignment detected in the super-resolution image 715. Misalignment information 735 may specify a magnitude of misalignment and/or a direction of misalignment for example, where misalignment information 735 merely signals a direction (e.g. right or left). In an embodiment, misalignment information 735 includes a "unit-less" value which may need to be subsequently converted into to a physical distance value specific to the particular one or more display panels.

For example, device 700 may include or couple to alignment logic 750 which receives the misalignment information 735 and which includes or has access to data 740 which describes one of more features of the one or more display panels. Data 740 may identify, for example, which displays correspond to which portions of a reference image and/or may identify one or more display dimensions. Based on such data 740 and the misalignment information 735, alignment logic 750 may determine one or more of a specific display or displays to be repositioned, a direction of such repositioning and a physical distance for such repositioning. As a result, a signal 755 indicating some or all such determined information may be sent from alignment logic 755 for adjusting one or more displays panels.

Techniques and architectures for determining a misalignment of a multi-panel display assembly are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing e operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A method comprising:
   receiving a plurality of images each including a respective representation of one or more tileable display panels;
   creating a super-resolution image based on the plurality of images;
   automatically generating misalignment information based on the super-resolution image and based on fiducial data describing a reference image; and
   based on the misalignment information, sending a signal indicating an adjustment to a position of a first tileable display panel of the one or more tileable display panels.

2. The method of claim 1, wherein the receiving the plurality of images includes receiving one or more of the plurality of images at a server via a network.

3. The method of claim 1, further comprising:
   capturing the plurality of images with an image sensor of a first device, wherein receiving the plurality of images includes receiving the plurality of images with software executing on the first device.

4. The method of claim 1, further comprising automatically adjusting the first tileable display panel of the one or more tileable display panels in response to the signal.

5. The method of claim 4, wherein automatically adjusting the first tileable display panel includes modifying mapping logic of the first tileable display panel from corresponding a pixelet to a first sub-region of a logical display region to corresponding the pixelet to a second sub-region of a logical display region.

6. The method of claim 1, further comprising:
   receiving a second plurality of images each including a respective representation of the one or more tileable display panels;
   creating a second super-resolution image based on the second plurality of images;
   automatically generating second misalignment information based on the second super-resolution image and based on the fiducial data; and
   based on the second misalignment information, sending a second signal indicating a second adjustment to the one or more tileable display panels.

7. The method of claim 1, wherein the first tileable display panel comprises:
   a screen layer upon which a unified image is projected from a backside;
   an illumination layer to generate light; and
   a display layer disposed between the screen layer and the illumination layer, the display layer including a plurality of pixlets separated from each other by spacing regions, wherein each of the pixlets is positioned to be illuminated by the light from the illumination layer and to project a magnified image sub-portion onto the backside of the screen layer such that the magnified image sub-portions collectively blend together to form the unified image which covers the spacing regions on the display layer.

8. A non-transitory computer-readable storage medium having stored thereon instructions which, when executed by one or more processing units, cause the one or more processing units to perform a method comprising:
   receiving a plurality of images each including a respective representation of one or more tileable display panels;
   creating a super-resolution image based on the plurality of images;
   automatically generating misalignment information based on the super-resolution image and based on fiducial data describing a reference image; and
   based on the misalignment information, sending a signal indicating an adjustment to a position of a first tileable display panel of the one or more tileable display panels.

9. The computer-readable storage medium of claim 8, wherein the receiving the plurality of images includes receiving one or more of the plurality of images at a server via a network.

10. The computer-readable storage medium of claim 8, the method further comprising:
    capturing the plurality of images with an image sensor of a first device, wherein receiving the plurality of images includes receiving the plurality of images with software executing on the first device.

11. The computer-readable storage medium of claim 8, the method further comprising automatically adjusting the first tileable display panel of the one or more tileable display panels in response to the signal.

12. The computer-readable storage medium of claim 8, the method further comprising:
receiving a second plurality of images each including a respective representation of the one or more tileable display panels;
creating a second super-resolution image based on the second plurality of images;
automatically generating second misalignment information based on the second super-resolution image and based on the fiducial data; and
based on the second misalignment information, sending a second signal indicating a second adjustment to the one or more tileable display panels.

13. The computer-readable storage medium of claim 8, wherein the first tileable display panel comprises:
a screen layer upon which a unified image is projected from a backside;
an illumination layer to generate light; and
a display layer disposed between the screen layer and the illumination layer, the display layer including a plurality of pixlets separated from each other by spacing regions, wherein each of the pixlets is positioned to be illuminated by the light from the illumination layer and to project a magnified image sub-portion onto the backside of the screen layer such that the magnified image sub-portions collectively blend together to form the unified image which covers the spacing regions on the display layer.

14. A method comprising:
sending a plurality of images each including a respective representation of one or more tileable display panels, wherein a super-resolution image is created based on the sending of the plurality of images, and wherein misalignment information is automatically generated based on the super-resolution image and based on fiducial data describing a reference image; and
receiving a signal based on the misalignment information, the signal indicating an adjustment to a position of a first tileable display panel of the one or more tileable display panels.

15. The method of claim 14, wherein the sending the plurality of images includes sending one or more of the plurality of images to a server via a network.

16. The method of claim 14, further comprising capturing the plurality of images with a first device, and wherein sending the plurality of images includes sending the images to software executing on the first device.

17. The method of claim 14, further comprising automatically adjusting the first tileable display panel of the one or more tileable display panels in response to the signal.

18. The method of claim 14, further comprising:
creating the super-resolution image based on the plurality of images; and
automatically generating the misalignment information based on the super-resolution image and based on the fiducial data.

19. The method of claim 14, further comprising:
sending a second plurality of images each including a respective representation of the one or more tileable display panels, wherein a second super-resolution image is created based on the sending of the second plurality of images, and wherein second misalignment information is automatically generated based on the second super-resolution image and based on the fiducial data.

20. The method of claim 14, wherein the first tileable display panel comprises:
a screen layer upon which a unified image is projected from a backside;
an illumination layer to generate light; and
a display layer disposed between the screen layer and the illumination layer, the display layer including a plurality of pixlets separated from each other by spacing regions, wherein each of the pixlets is positioned to be illuminated by the light from the illumination layer and to project a magnified image sub-portion onto the backside of the screen layer such that the magnified image sub-portions collectively blend together to form the unified image which covers the spacing regions on the display layer.

* * * * *